3,159,449
MODIFIED STEREO REGULATED POLYOLEFIN FILAMENTARY ARTICLES AND PROCESS FOR PRODUCING SUCH ARTICLES
Max Levine, Cleveland Heights, and Beryl M. Kuhn, Rocky River, Ohio, assignors, by mesne assignments, to Hercules Powder Company, Wilmington, Del., a corporation of Delaware
No Drawing. Filed Nov. 25, 1960, Ser. No. 71,455
6 Claims. (Cl. 8—130.1)

This invention concerns readily modifiable stereo regulated polyolefin filamentary articles and methods for producing and modifying such articles. More particularly, this invention relates to a method for surface cracking stereo regulated polyolefin filamentary articles and to processes for subsequently desirably modifying such articles by inserting and stabilizing dyestuffs or other substances in the surface faults produced in such articles.

Stereo regulated polyolefin filamentary articles including filaments, threads, yarns, cords and the like have many commercially desirable properties such as, for example, excellent tenacities, superior fatigue and abrasion resistance and the like. In addition to having excellent physical properties, stereo regulated polyolefin filamentary articles can be competitively marketed since the monomers from which such articles are produced are relatively inexpensive. For these and other reasons, therefore, stereo regulated polyolefin articles have potentially wide application in the domestic as well as in the industrial market. Olefin polymers are substantially inert substances, however, and, while chemical inertness is of considerable advantage in some applications, it is difficult to find dyestuffs which are capable of fastening themselves to such articles strongly enough to produce satisfactorily color fast filamentary articles. In order for filamentary articles to enjoy widespread use, it is necessary that such articles be obtainable in a wide range of colors; it is also necessary that the dyed articles be reasonably color fast when subjected to washing and/or dry cleaning treatments.

Several methods have in the past been suggested for producing substantially color fast, dyed stereo regulated polyolefin filamentary articles. One of the methods which has thus been proposed consists of incorporating color pigments into the stereo regulated polyolefin materials prior to conversion of the latter into the desired filamentary articles. This type of coloration, commonly referred to as spin dyeing, is advantageous for the reason that it enables filamentary articles to be obtained in a wide range of colors. In addition, pigmented filamentary articles display a high degree of resistance to light fading as well as to color extraction by dry cleaning solvents and aqueous solutions of detergents. It is necessary in such a method of dyeing, however, for the manufacturer of the filamentary articles to color the articles during their fabrication; this in turn compels the manufacturer to maintain a considerable inventory of stock so that he can supply his customers with any of the various colors they require. In addition to the inventory problem, however, spin dyeing is inconvenient for the reason that it necessitates a complete cleaning of the filament producing equipment whenever a change of colors is to be effected. Such an interruption is, of course, both time consuming and expensive.

Another method which has been suggested for coloring stereo regulated polyolefin filamentary articles comprehends the introduction of suitable dyestuffs into the interior of the articles through the agency of a swelling agent. In this method of dyeing, the dyestuffs are dissolved in polyolefin solvating substances, and the filamentary articles are exposed to the resulting solution. The solvating material causes the filamentary articles to swell and become semipermeable, thus, facilitating entry of the dyestuff into the interior of the articles. While this process produces a satisfactorily colored product, it is difficult to subsequently remove the solvating substance from the filamentary articles sufficiently to insure its noninterference with the physical properties of the articles.

In addition to the foregoing coloring techniques, various dyestuffs have been proposed for coloring stereo regulated polyolefin filamentary articles. As has previously been mentioned, however, stereo regulated polyolefins are substantially inert and they do not possess strongly developed "dye sites." As a consequence, most dyestuffs are incapable of establishing a sufficiently strong bond with filamentary articles made from such materials to be commercially feasible as colorants.

Now, however, a method has been found for producing dyed stereo regulated polyolefin filamentary articles which are substantially color fast. The method found is relatively inexpensive and may be incorporated into the ordinary and usual steps employed in fabricating filamentary articles. The method of the invention permits the dyeing operation to be divorced from the filament forming process, thus, obviating the necessity for maintaining large inventories; furthermore, the filamentary articles can be dyed in a wide variety of substantially fast colors, and good leveling is obtained. In addition to the wide variety of dyestuffs which may be introduced into the filamentary articles by the method of the invention, however, many other substances may also be so added for the purpose of desirably modifying the characteristics of the articles.

In accordance with this invention, stereo regulated polyolefin filamentary articles can be desirably modified by a process comprising the steps of applying to a stereo regulated polyolefin filamentary article possessing a crystallinity index of more than 51, at least about 2% by weight, of a surface active agent, drawing the coated filamentary articles more than 1.5 times their undrawn length, applying a modifying substance to the drawn articles, and stabilizing the modifying substance in the drawn articles.

In carrying out the process of the invention, stereo regulated polyolefin filamentary articles having sufficient crystallinity are coated with a suitable amount of a surface active agent and then drawn, i.e., stretched, at least to the point where surface cracking or crazing results. Following drawing, a modifying substance is placed in the cracks and stabilized so as to prevent its subsequent removal.

In the case of stereo regulated polyolefin filamentary articles which are to be used in an application requiring a voluminous or bulked product, or where modifying substances other than dyes are to be added to such articles, a process which shall be hereafter referred to as "shrink locking" may be used to obtain satisfactory stabilization of the modifier. In the shrink lock process, the filamentary articles are drawn, under conditions such that they develop a latent ability to shrink, at least to the point at which the surface of the filamentary articles becomes crazed with small surface cracks or faults; it is into these cracks that the modifying substances such as, for instance, dyestuffs, chemical stabilizers, lubricants and the like are subsequently inserted. After the desired modifying substances have been introduced into the stress produced surface cracks, the filamentary articles are subjected to a heating step which causes the cracks to contract, due to shrinkage of the articles, thus effectively locking the modifying substances into the articles.

In instances where nonbulked, colored, stereo regulated filamentary articles are desired, a color stabilization process which shall be referred to as "chrome locking" is employed. In the chrome lock process, the filamentary articles are coated with an amino acid type surface active agent before being drawn. The drawing itself is carried out in the same manner as in the case of the shrink locked filamentary articles, however, a chrome dyeing process, which involves treatment of the filamentary articles with a chroming salt prior to, concurrently with, or following the actual application of the dye, is used for coloring the articles. In the chrome lock stabilization process, the dyestuff, chroming salt and the amino acid surface active agent apparently form a complex within the cracks which has a marked affinity for the filamentary articles, and dyes introduced in this manner have proven to be exceptionally fast.

Any of the various types of stereo regulated polyolefin filamentary articles may be surface cracked and modified by the process of the invention. Certain advantages have been found, however, in using the process for modifying stereo regulated poly-α-olefin filamentary articles formed from monomers having at least three carbon atoms. Examples of such materials are, for instance, stereo regulated polypropylene, stereo regulated poly-α-butylene and similar substances. Particular advantages, however, have been found when the process is employed for modifying filamentary articles formed from isotactic polypropylene.

While absolute values are difficult if not impossible to ascertain, it has been determined that stereo regulated polyolefin filamentary articles which are to be modified by the method of the invention should possess a certain minimum crystallinity for the most efficient surface cracking. Because of the difficulties encountered in measuring absolute quantities, a method, now generally accepted, has been devised for determining relative crystallinities of articles of this type. This method, by which the relative crystallinity of a stereo regulated polyolefin article, hereafter referred to as its crystallinity index, can be determined, makes use of X-ray diffraction equipment comprising a copper anode X-ray tube, a diffractometer, a goniometer and a Geiger counter. The untreated sample filamentary article is exposed to a stream of X-rays, and the amount of the diffracted rays, which provides a measure of the sample's crystallinity, is measured. For the purposes of this disclosure, equipment of this type manufactured by Phillips Electronics Incorporated and including a Type No. 12,045 basic X-ray source, a Type No. 12,096 diffractometer and a Type No. 42,202 goniometer, equipped with a Geiger counter, was operated at a scan speed of 0.25° per minute, and a chart speed of 0.125 inch per minute. The line focus was passed through a 1° divergence slit before impinging upon the sample; it was subsequently passed through a filter (infra), through a 0.006 inch receiving slit, and finally through a 1° scatter slit. The diffractometer rate meter was adjusted so as to have a scale factor of 16, a multiplier of 1, a time constant of 2, and was set for a full scale 800 counts per second. The operating voltage of the diffractometer was 1,435 volts and the basic unit settings were 45 kvp. and 10 ma., respectively. The sample, which was mounted on a holder having an 11 mm. x 20 mm. rectangular opening, consisted of two layers of 800 denier, continuous, undrawn yarn arranged in uniformly parallel fashion so as to cover the entire opening of the holder. The sample was radially scanned by the X-rays from a point where $2\theta$ equalled 10° to a point where $2\theta$ equalled 20°. The samples under examination were first exposed to radiation on the goniometer while the latter was equipped with a nickel foil filter, and subsequently when it was fitted with a cobalt oxide filter. The crystallinity index was determined from the equation:

$$C_R I = \frac{I_{100} - I_{BA}}{I_{AM}} (10)$$

in which $C_R I$ is the crystallinity index; $I_{100}$ is the intensity, i.e., the measured height of the peak traced on the chart, of the diffracted radiation at a Miller's index of 100, the "100 diffraction peak," obtained with nickel filtered X-rays; $I_{BA}$ is the intensity of the 100 diffraction peak obtained with cobalt filtered X-rays on the $2\theta°$ line at which $I_{100}$ is measured; $I_{AM}$ is the distance from the common $2\theta°$ line to the left leg of the 100 diffraction peak, measured at one half the true intensity, i.e., measured at a point one half the distance (determined along the common $2\theta°$ line) between the top of the 100 diffraction peak obtained using the nickel foil filter and the top of the 100 diffraction peak obtained with the cobalt oxide filter.

It has been found that a crystallinity index, as measured above, of more than 51 is required to obtain efficient surface cracking by the method of the invention. Much greater advantages are realized, however, when the stereo regulated polyolefin filamentary articles posses an index of at least about 55 and, in the preferred embodiment of the invention, filamentary articles having a crystallinity index of at least about 65 are employed. Stereo regulated polyolefin filamentary articles possessing suitable crystallinity indices may be obtained, among other ways, by suitably controlling the conditions i.e., temperature, drawdown and the like, under which such articles are formed.

For purposes of stabilizing modified stereo regulated polyolefin filamentary articles by the shrink lock process, any wetting agents including those of the cationic, anionic, or nonionic type may be used. Suitable surface active agents include, for instance, Triton X–100—an alkylaryl polyether alcohol made by the Rohm & Haas Company, lauryl pyridinium chloride, Duponol D—a long chain alcohol sodium sulfate compound made by the E. I. du Pont de Nemours Company, Synthramine A—cetyl trimethyl ammonium bromide produced by Arnold Hoffman and Company, Igepon T—a substituted amide manufactured by the General Aniline and Film Corporation, Peregal OK—an ethylene oxide condensation product with an organic amine made by the General Aniline and Film Corporation, and the like.

To obtain effective color stabilization by the chrome lock process, however, it has been determined that surfactants possessing amphoteric characteristics should be employed to coat the filamentary articles prior to the drawing step, and amphoteric, amino acid type surfactants have been found to be especially suited for the purpose. By an amino acid type surfactant is meant any surface active compound which contains an amino acid as a constituent part of the molecule; the amino acid may be present as a free acid, or it may take the form of a salt of the acid; the acid molecule can be linear or branched; and, if desired, either of the amino hydrogen atoms may be substituted with, for instance, alkyl radicals. While particular advantages are realized from the use of any of various N-alkyl amino acids, in its preferred embodiment, the invention contemplates the use of filamentary coating materials such as the Deriphat surfactant compounds manufactured by the General Mills Corporation, i.e., N-alkyl propionic acid compounds in which the alkyl radical may be, among other things, lauryl, or a mixture of alkyl chains derived from coconut oils, and the like.

The surface active agents may be applied as a spin finish immediately following formation of the stereo regulated filamentary articles; alternatively, however, they can be coated on the articles at any time prior to the drawing process. The surface active agent may be applied to the fibers by passing the filamentary articles through an aqueous solution or suspension containing the agent, by passing the filamentary articles over a roll wetted with such an aqueous solution or suspension, by suspending the articles in a bath containing the wetting agents, or in any of the other ways for coating filamentary articles with liquid substances well-known in the art. For superior results, the coating should be applied in a quantity such that the agent constitutes at least about 2%, by weight, of the filamentary article. Advantageously, however, at least about 3%, by weight, of the surface active agent is included on the filamentary article, and greater amounts may be employed if desired.

Following coating, the stereo regulated filamentary articles are drawn to develop the surface cracking necessary for the purposes of the invention. Drawing of the articles may be accomplished between pairs or other arrangements of draw rolls, over pins, between or on self-advancing reels of the type shown in U.S. Patent No. 2,210,914, or in any of the other usual ways known in the textile art. To achieve the proper degree of surface cracking, the stereo regulated polyolefin filamentary articles are drawn more than 1.5 times their original length. Preferably, the articles are drawn from between about 2.0 times to about 5 times their initial size, however, if desired, they can be extended to a length only slightly less than their point of ultimate elongation.

When a modifier is to be stabilized in the stress cracked filamentary articles by the shrink lock process, it is necessary that the drawn articles be capable of sufficient shrinkage to effectively lock the modifier into the surface faults. As a general rule, it has been found that the greater the amount of shrinkage of the filamentary articles following addition of the modifier, the greater is the stability, i.e., resistance to extraction during washing, dry cleaning, etc., imparted to the modifier. It has been determined, for instance, that the most stable modified articles are those which have a free shrinkage, i.e, a post draw shrinkage capability in boiling water, of about 10% or greater. Filamentary articles can be produced which are reasonably stable, howeverd, with as little as about a 5% shrinkage, and since the molecular configuration of the modifier plays an important role in determining the ease with which modifiers can be removed from minimally sealed surface cracks, good stabilization is possible with the shrink lock process even in areas below 5% shrinkage if care is exercised in selection of the modifier.

While shrinkage is of importance in shrink lock stabilization, since chrome lock color stabilization does not depend upon sealing off of the surface cracks to achieve satisfactory color fastness, the amount of shrinkage following the drawing process of little consequence; indeed, it is preferable where chrome lock stabilization is to be used for producing nonbulked colored fibers that shrinkage be slight.

The conditions under which the stereo regulated polyolefin filamentary articles are drawn plays an important role in determining the amount by which the stereo regulated polyolefin filamentary articles can be shrunk. In particular, the temperature at which the drawing is performed has been found to influence the shrinkage capability of the filamentary articles. It has been determined, for instance, that, generally, the greatest amount of shrinkage is imparted to filamentary articles which have been drawn at about room temperature, that is to say from about 20° C. to about 30° C. The drawing process may be performed at any temperature up to, and even somewhat over, about 120° C., however, and still produce an acceptably shrinkable product. The temperature at which the drawing is conducted can be controlled in any of the well-known ways such as, for instance, by inserting electrical heating elements in the draw rolls, or by constructing draw rolls with thermal jackets through which hot or cold liquids can be passed; alternatively, however, the entire drawing zone may be temperature controlled by any of the usual methods.

Filamentary articles which are to be stabilized by the shrink lock process may be dyed with any dyestuffs including, for instance, acid dyes, premetallized dyes, mordant dyes, basic dyes, disperes dyes and the like. While dyeing can be accomplished by any of the techniques commonly employed by dyers, if the dyeing process is carried out at elevated temperatures, shrinkage of the articles can be performed simultaneously with dyeing to produce substantially color fast filamentary articles in a single operation. If, however, the dyeing step is performed at temperatures and times less than those required to produce shrinkage sufficient to effectively lock the dyestuffs in the cracks, the shrinking process may be accomplished in a subsequent step. Shrinkage following dyeing may be performed, for example, by immersing the filamentary articles in hot liquids, for example, in boiling water; shrinkage can also be induced by dry heating the articles, as for instance, in air. Although the time and temperature required for proper shrinkage are interdependent, and must be determined experimentally since they are influenced by factors such as the heat transfer medium, the type of apparatus in which the shrinking is performed, and like considerations, when the filamentary articles are shrunk in boiling water, a heating time of about 1–2 minutes is adequate; when the shrink locking is performed in a circulating air oven heated to 120° C., approximately 1–3 minutes is sufficient to satisfactorily stabilize the dyed articles. Irrespective of the manner in which the heating process is carried out, however, shrinking can be most efficiently accomplished when the filamentary articles are maintained in a substantially unstressed, i.e., relaxed, condition.

In addition to its use for incorporating dyestuffs into stereo regulated filamentary articles, the surface crack and shrink lock stabilization process is ideally suited for the addition of many other useful modifying materials to stereo regulated polyolefin filamentary articles. The process can, for example, be employed to introduce lubricants into the interiors of filamentary articles which are to be used in the manufacture of twines, ropes and the like for the purpose of providing, through migration of the incorporated oils to the surface of the filaments, a wear reducing protective film. Examples of suitable lubricants are, for instance, the Tween lubricants manufactured by the Atlas Powder Corporation, i.e., polyoxyethylene sorbitan monolaurate, polyoxyethylene sorbitan monopalmiate, etc., and similar substances. Filamentary articles to which lubricants are to be added are surface cracked in accordance with the procedure previously disclosed, and the lubricants are applied, for example, in the manner indicated as being suitable for coating filamentary articles with surfactants. Modification of stereo regulated filamentary articles with lubricants differs from dyestuff modification, however, by reason of the fact that the sealing of surface cracks in filamentary articles modified by the addition of the lubricants does not prevent migration of the modifier to the surface of the articles. Advantageously, such lubricants are stabilized in the filamentary articles by heat treatment following the addition of the lubricating substances, however, if a somewhat more rapid escape of lubricants from the cracks to the surface of the articles is desired, heat stabilization need not be performed.

In a similar manner, antistatic agents, "antistats," may be readily introduced into the surface cracked filamentary articles, and the addition of antistats to filamentary articles intended for use as floor covering materials is particularly useful. It has been found that when antistats are applied to such materials by ordinary methods, the antistat is soon dissipated by cleaning treatments and by the traffic to which the floor covering is exposed. When the antistatic agent is introduced into the cracked filamentary articles of the invention, however, antistat removed from the surface of the floor covering through use is continuously replaced with material supplied by migration of the antistat from the cracks. In addition, antistats introduced into floor coverings by the method of the invention resist removal during cleaning treatments since the contact time of cleaning substances with floor coverings which is normally encountered in cleaning processes is insufficient to substantially remove the antistatic agent from the cracks. Examples of antistatic agents which may be satisfactorily added to surface cracked filamentary articles include, for instance, materials such as Aerotex CSN—dimethyl hydroxymethyl stearamidopropyl ammonium nitrate produced by the American Cyanamid Corporation, Tween 20—polyoxyethylene sorbitan monolaurate manufactured by the Atlas Powder Corporation, and similar substances. The antistats may be applied by the method employed for the addition of lubricants, and, like the process for the addition of lubricants, although heat stabilization is preferred (migration of the antistatic agent to the surface of the filamentary article occurs even though the cracks have been sealed), the surface cracks need not be sealed following antistat addition.

The modification method of the invention, including surface cracking and shrink lock stabilization lends itself particularly well to the addition of materials such as antioxidants and light stabilizers to stereo regulated polyolefin filamentary articles. Polyolefin articles frequently undergo deterioration of their physical properties when brought into prolonged contact with light and/or air, and it is desirable, therefore, to avoid such effects by including stabilizing materials in the articles. Many of the most efficient stabilizers decompose at the temperatures required for extrusion of the stereo regulated polyolefin materials, however, and it is virtually impossible to incorporate such stabilizers into filamentary articles by extrusion methods. One may obtain substantial protection against the adverse effects caused by exposure of polyolefin articles to light and air, however, by incorporating suitable stabilizing substances into the surface cracked articles of the invention. Stabilizers which may be satisfactorily introduced into such stereo regulated polyolefin filamentary articles are, for example, U.V. Stabilizer No. Nine—2-hydroxy-4-methoxybenzophenone made by the American Cyanamid Corporation, hydroquinone, and other substances. The stabilizers may be introduced into the cracks by applying them as a spin finish, i.e., immediately following formation of the articles, in combination with the surface active agents required for surface cracking; alternatively, however, they may be introduced into the surface cracks at any time subsequent to the formation of such cracks. Following application of the stabilizer or antioxidant to the filamentary article, the protective materials are stabilized in the cracks by heat shrinking the articles. Techniques substantially similar to those employed for the addition of dyestuffs to stereo regulated polyolefin filamentary articles may be employed for incorporating antioxidants and light stabilizers into the filamentary articles.

It is also possible to introduce readily dyeable substances into stereo regulated polyolefin filamentary articles surface cracked in conformity with the method of the invention by applying suitable monomers to the filamentary articles and subsequently polymerizing the monomers within the cracks. Combinations of monomers such as urea formaldehyde, or melamine formaldehyde, as well as individual monomers such as dimethylol ethylene urea, 2-vinyl pyridine, and the like may all be successfully employed for this purpose. The monomeric substances, together with an appropriate catalyst—where one is required, may be added as a spin finish, or the monomers may be placed in the surface cracks subsequent to the point at which the cracks are developed. In any event, following their introduction, the monomers are polymerized in the surface cracks in any of the usual ways, for example, with heat, and the articles are dyed with a suitable dyestuff. Stereo regulated polyolefin filamentary articles modified in this manner show dye penetration well into the interiors of the fibers, and, in addition, the articles do not crock. Insofar as processing conditions such as stretch, quantity of surface active agent, and the like are concerned, filamentary articles modified by the addition and subsequent polymerization of monomers may be processed in substantially the same manner as that used to introduce dyestuffs directly into surface cracked articles. While the articles may be heat stabilized, the polymerization step frequently affects the molecular structure of the modifier in the cracks in such a way that stabilization is not required.

The sensible characteristics of the stereo regulated polyolefin filamentary articles, especially properties such as texture, appearance and the like, may be desirably altered by introducing various modifying substances into the surface cracked articles of the invention. Substances such as, for example, acrylic acid, acrylamide, allyl alcohol and the like may be added to, and polymerized in, the surface cracks, and when so added, such materials have a definite influence on the surface characteristics of the articles. It is, of course, possible for monomers polymerized in situ in the surface cracked articles to enhance the dyeability of the articles as well as affect their appearance and feel. A double effect of this type may be accomplished by adding a composition such as, for instance, one containing Aston 108—a polyamine produced by the Onyx Oil and Chemical Company, in combination with Eponite 100—a diepoxide material manufactured by the Shell Chemical Corporation. If preferred, the modifying substances may be heat stabilized in the cracks, and in the case of water soluble systems, at least partial stabilization is desirable. The processing conditions required for surface cracking and for applying and polymerizing the monomers comprehended by this type of modification are substantially the same as those required for modifications involving monomers added for the purpose of improving the dyeability of the stereo regulated polyolefin filamentary articles.

In addition to the materials suggested, many other substances such as, for instance, those which react with rubber to form improved bonds, e.g., tetramethylene diisocyanate; bactericides; essential oils and the like can advantageously be similarly added to the surface cracked stereo regulated filamentary articles of the invention.

Unlike the shrink lock process, which depends upon shrinkage of the filamentary articles for modifier stabilization, the chrome lock process appears to achieve a color stabilizing effect through the agency of a complex formed by the dyestuff, surfactant and the chroming salt. The complex apparently has sufficient affinity for stereo regulated polyolefins to prevent its removal from the surface cracks of filamentary articles formed from such polyolefins. Whatever the mechanism may be, however, the use of the chrome lock process for color stabilizing purposes results in substantially color fast, dyed filamentary articles. In practicing the chrome lock process, the filamentary articles are coated with an amino acid type surfactant and surface cracked in the manner previously disclosed; the articles are then chromed by a treatment with a "chroming salt" in an aqueous bath. Chroming can be performed prior to dyeing, a process known as bottom chroming or, if the chroming salt and dye are compatible, it may be performed during the dyeing, a process known as metachroming; such a process can also take place, however, subsequent to dyeing, in which event the process is known as top chroming. While any of various salts of chromic acid such as, for instance, sodium dichromate may be used as a chroming salt, other salts including salts of aluminum, tin, iron and copper may also be employed for the purpose. Relatively small amounts of the salt are required for chroming the surface cracked filamentary articles, e.g., while 2% by weight of salt, based on the weight of the filamentary articles in the bath, has produced excellent results, lesser amounts of the chroming salt may be employed if desired. Chroming normally is carried out in a hot, aqueous bath, conveniently from about 60° C. to 100° C., and can be accomplished, depending upon the reaction conditions, in from about 15 minutes to one hour. The chromed filamentary articles may be dyed by any of the usual dyeing techniques, and since the chrome lock process does not depend for color stabilization upon the surface crack contraction obtained through filamentary shrinkage, heat processing is unnecessary. The chrome locked filamentary articles may be subjected to heat shrink processing if desired, however. Any dyes such as azo dyes, anthraquinone dyes, disazo dyes, triphenylmethane, etc. are suitable for the chrome lock dyeing process. Among such dyes, the chrome dyes, acid dyes, acid premetallized dyes and the like are all satisfactory for the purpose of the invention.

The following examples, while not intended to be limiting in nature, are illustrative of the invention. All parts shown in the examples are parts by weight unless otherwise specified.

*Example I*

A melt spun, stereo regulated polypropylene yarn, having a crystallinity index of 74.3 and consisting of 35 filaments of 21 denier weight, was coated with a sufficient amount of an aqueous solution of N-lauryl-$\beta$-amino-propionic acid to produce a yarn containing 3% by weight of the surfactant. The coated yarn was subsequently drawn 3.5 times between two drawing rolls, the first of which, the feed roll, was maintained at about 50° C. while the second, or draw roll, was controlled at about 125° C. After being drawn, the filaments, which had a free shrinkage of 10%, were knit into a fabric and subsequently scoured in an aqueous detergent solution of 50° C.–60° C. Following scouring, the fabric was placed in a dye bath formulated so that for every part of polypropylene fabric present the bath contained 40 parts of water, 0.01 part of Irgalan Navy Blue 2GL—a dye manufactured by the Geigy Chemical Company, and 0.01 part of Triton X–100. Following initiation of dyeing, the solution was heated to the boil, a process requiring approximately 30 minutes, and maintained at the boil for 30 minutes. The dyed, shrunk fabric was subsequently removed from the bath, rinsed with water and dried. The fabric, which was dyed by the process to a medium navy blue shade, proved to be color fast to a scour in a 0.1% by weight aqueous solution of Triton X–100 heated to 50° C.–60° C. and, in addition, showed substantially no color change after being submerged in tetrachlorethylene, a common dry cleaning solvent, and shaken at room temperature for two hours.

*Example II*

A 3400 denier, isotactic polypropylene yarn, having a crystallinity index of 78.5 and containing 140 filaments, was coated with 3.5% by weight of an oil containing ethoxylated fatty amine surfactant. Yarn thus coated was subsequently drawn 4.0 times its original length between two drawing rolls maintained at room temperature. Prior to dyeing, the drawn yard, which had a free shrinkage of 23%, was knit into a fabric and scoured in an aqueous detergent solution at a temperature of 50° C.–60° C. The fabric was dyed in conformity with a formula calling for 40 parts of water, 0.01 part of Supranol Red PBX-CF—a dye produced by the General Aniline and Film Corporation, and 0.01 part of Triton X–100, for every part of polypropylene fabric present. The dye bath was heated to the boil, a process which required about 30 minutes, and maintained there for one-half hour. The fabric, shrunk by the dyeing process and colored a medium red, was subsequently removed from the dye bath, washed with water and dried. Fabric thus dyed proved to be substantially color fast when treated with a hot, 50° C.–60° C., aqueous solution of Triton X–100.

*Example III*

A 225,000 denier staple tow formed from the untreated yarn of Example II and coated with 5% by weight of an alkylaryl polyether alcohol surfactant (Triton X–100) was drawn 4.0 times its original length in two stages; the first stage of the draw was carried out at room temperature while the second stage was performed at about 125° C. The drawn tow, which had a free shrinkage of about 15%, was bulked in a stuffing box type crimper and subsequently scoured in an aqueous solution of Triton X–100 heated to 50° C.–60° C. Dyeing of the bulked tow was accomplished in a bath compounded to contain 40 parts of water, 0.01 part of Polar Yellow 5GN—a dyestuff manufactured by the Geigy Chemical Company, and 0.01 part of Triton X–100, for every part of polypropylene present. Dyeing was carried out in the manner of Example I, and the crimped tow, dyed by the process to an attractive bright yellow color, proved to be highly resistant to color extraction both by hot, aqueous detergents and by tetrachloroethylene.

*Example IV*

A 35 filament, 735 denier stereo regulated polypropylene yarn with a crystallinity index of 79.6, and having a 5% by weight coating, applied as a spin finish, of an alkylaryl polyether alcohol surfactant (Triton X–100), was hot drawn 3.5 times its original length. The yarn, which had a free shrinkage of 4.1%, was knit into fabric and subsequently scoured in the manner disclosed in Example I. The fabric was dyed by the process of Example I in accordance with a formula specifying 40 parts of water, 0.01 part of Irgalan Red 3G—a dyestuff produced by the Geigy Chemical Company, and 0.01 part of Triton X–100, for each part of the polypropylene present. The dyed fabric bled upon being scoured in an aqueous solution of Triton X–100 heated to 50° C.–60° C., however, wash fastness was greatly improved when the fabric was heat shrunk for one minute, following dyeing, in air heated to 120° C.–150° C.

*Example V*

A 35 filament isotactic polypropylene yarn with a crystallinity index of 79.6 and a spun denier of 735 was coated with 3% by weight of N-lauryl-$\beta$-aminopropionic acid applied in aqueous solution as a spin finish. The coated yarn was hot drawn 3.5 times its original length, knit into fabric, and subsequently scoured at 50° C.–60° C. in a 0.1% aqueous solution of Triton X–100. The fabric was dyed in a bath containing 40 parts of water, 0.01 part of Triton X–100, 0.01 part of Eriochrome Geranol R—a purple dyestuff manufactured by the Geigy Chemical Company, and 0.02 part of a buffer, $(NH_4)_2SO_4$, for every part of fabric present. The dye solution was brought to the boil, a process which required about 40 minutes, and maintained at the boil for 30 minutes. After a boiling period of 30 minutes, 0.02 part of formic acid was added to the bath and boiling was allowed to proceed for another 30 minutes. Following boiling in the presence of the formic acid, 0.02 part of $Na_2Cr_2O_7$ was added and boiling was continued for an additional 60 minutes. The fabric was then withdrawn from the dye solution, rinsed with water and dried. Neither scouring in a hot solution of Triton X–100, nor extraction in tetrachloroethylene substantially affected the color of the dyed fabric.

In addition to providing a superior method for producing substantially fast, modified stereo regulated polyolefin filamentary articles, the process of the invention is advantageous for the reason that it permits the fabrication of the surface cracked filamentary articles to be separated from the subsequent modification of such articles. In the shrink lock process, for instance, the filamentary articles may conveniently be fabricated and surface cracked by the manufacturer and then delivered to a fabricator who can dye and stabilize the articles himself, in many cases simultaneously. This permits both the fabricator and the manufacturer to maintain minimum inventories and also eliminates the risk to the manufacturer of producing articles of unacceptable color. Similarly, in the chrome lock process, the manufacturer can fabricate, surface crack and, if desired, even chrome the filamentary articles before forwarding the articles to the fabricator for dyeing. An additional advantage of modification according to the method of the invention, however, is that the surface cracked filamentary articles may be subjected to treatments such as stapilizing, crimping and the like before being dyed or otherwise modified.

What is claimed is:

1. A process for modifying stereo regulated polyolefin filamentary articles comprising applying to stereo regulated polyolefin filamentary articles having a crystallinity index of more than 51, at least about 2%, by weight, of a surface active agent, drawing the coated filamentary articles more than 1.5 times their original length and at least to the point where surface cracking results, introducing a modifying substance into the surface cracks, and shrinking the modified filamentary articles in a substantially relaxed condition to contract the surface cracks and thereby lock the modifying substance into the filamentary articles.

2. A process for modifying isotactic polypropylene filamentary articles comprising applying to isotactic polypropylene filamentary articles having a crystallinity index of at least about 55, a minimum of about 3% by weight of a surface active agent, drawing the coated filamentary articles so as to obtain a free shrinkage of at least about 5%, a minimum of about 2.0 times their original length and at least to the point where surface cracking results, introducing a modifying substance into the surface cracks, and shrinking the modified filamentary articles in a substantially relaxed condition to contract the surface cracks and thereby lock the modifying substance into the filamentary articles.

3. A process according to claim 2 in which the modifying substance is a dyestuff.

4. A process according to claim 2 in which the modifying substance is a member selected from the group consisting of lubricants, antistatic agents, antioxidants, light stabilizers, monomers polymerized in situ, bactericides and essential oils.

5. A process for dyeing stereo regulated polyolefin filamentary articles comprising applying to stereo regulated polyolefin filamentary articles having a crystallinity index of more than 51, at least about 2% of an amino acid type surface active agent, drawing the coated filamentary articles at least about 2.0 times their initial length and at least to the point where surface cracking results, chroming and dyeing the surface-cracked drawn filamentary articles, and shrinking the dyed filamentary articles in a substantially relaxed condition to contract the surface cracks and thereby lock the dye into the filamentary articles.

6. A process for dyeing isotactic polypropylene filamentary articles comprising coating isotactic polypropylene filamentary articles having a crystallinity index of at least about 55, with a minimum of about 3% by weight of an N-alkyl amino acid surface active agent, drawing the coated filamentary articles at least about 2 times their original length and at least to the point where surface cracking results, chroming and dyeing the surface-cracked, drawn filamentary articles, and shrinking the dyed filamentary articles in a substantially relaxed condition to contract the surface cracks and thereby lock the dye into the filamentary articles.

References Cited in the file of this patent

UNITED STATES PATENTS

| | | |
|---|---|---|
| 2,287,099 | Hardy et al. | June 23, 1942 |
| 2,411,474 | Stevenson | Nov. 19, 1946 |
| 2,677,591 | Moody | May 4, 1954 |
| 2,737,502 | Land et al. | Mar. 6, 1956 |
| 2,768,057 | Friederich | Oct. 23, 1956 |
| 3,007,765 | Ruyter | Nov. 7, 1961 |

FOREIGN PATENTS

| | | |
|---|---|---|
| 836,542 | Great Britain | June 1, 1960 |